Figure 1:
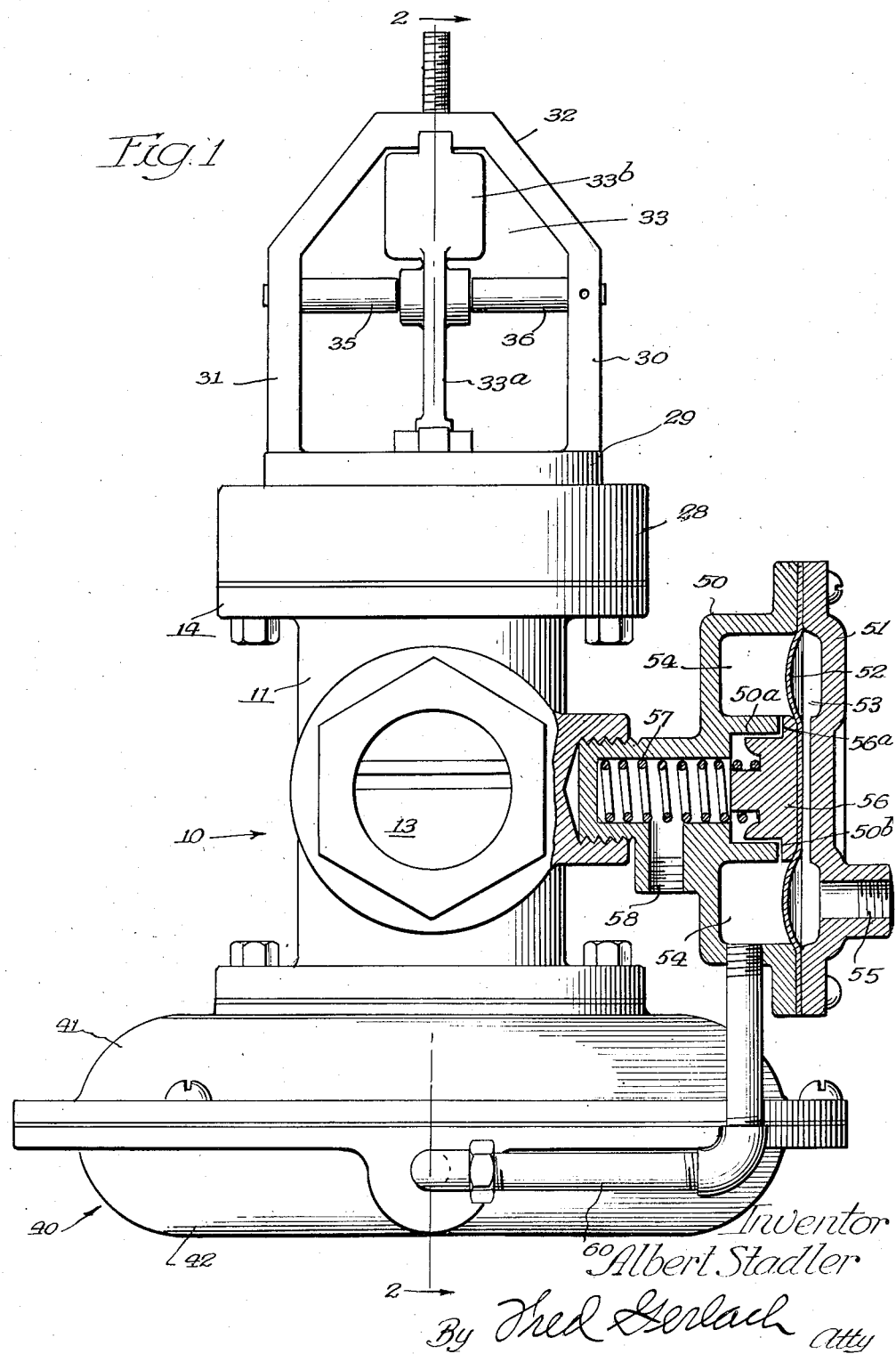

Aug. 14, 1951     A. STADLER     2,564,133
AUTOMATIC VALVE CONTROL MEANS
Filed Sept. 27, 1947     2 Sheets-Sheet 1

Inventor
Albert Stadler
By Fred Gerlach Atty

Aug. 14, 1951    A. STADLER    2,564,133
AUTOMATIC VALVE CONTROL MEANS
Filed Sept. 27, 1947    2 Sheets-Sheet 2

Inventor
Albert Stadler
By: Thed Gerlach atty

Patented Aug. 14, 1951

2,564,133

UNITED STATES PATENT OFFICE 2,564,133

AUTOMATIC VALVE CONTROL MEANS

Albert Stadler, Rockford, Ill., assignor to Eclipse Fuel Engineering Co., Rockford, Ill., a corporation of Illinois Application September 27, 1947, Serial No. 776,532

4 Claims. (Cl. 137—153)

1

This invention relates to automatic control devices and has to do more particularly with a mechanism which is operative automatically to close a fluid-fuel supply valve in response to an abnormal or excessive reduction of pressure either in the fuel supply or the air supply—the invention being primarily applicable to gas burner installations wherein air is supplied under pressure and wherein a failure of either the air pressure or gas pressure could give rise to a hazardous or otherwise objectionable condition if the gas supply line were not immediately closed.

The subject invention can be embodied as a device or combination of devices exclusive of the shut-off valve which it is designed to control, or it may include the valve as an integral part of an entire unit. I prefer, as a matter of convenience, to incorporate the valve in the same structure with the control device whenever it is practicable to do so; but it will become apparent as the description proceeds that there may be instances where it is more feasible to construct the control valve as a separate unit which is adapted to be suitably connected to the valve. I have elected to show in the accompanying drawings only the preferred arrangement wherein the valve forms an integral part of a self-contained unit; but those skilled in the art will readily apprehend that the novel control mechanism can be applied to a separate valve, if desired.

Broadly stated, my invention is characterized in that it comprises two co-operative pressure-actuated devices which are effective conjointly, but not individually, to maintain a fuel-supply valve open—one of said devices being energized by gas pressure while the other is energized by air pressure—the arrangement being such that a failure of either gas pressure or air pressure will cause the valve to close, and preferably to remain closed until manually reset following restoration of normal pressure conditions.

Figure 2:
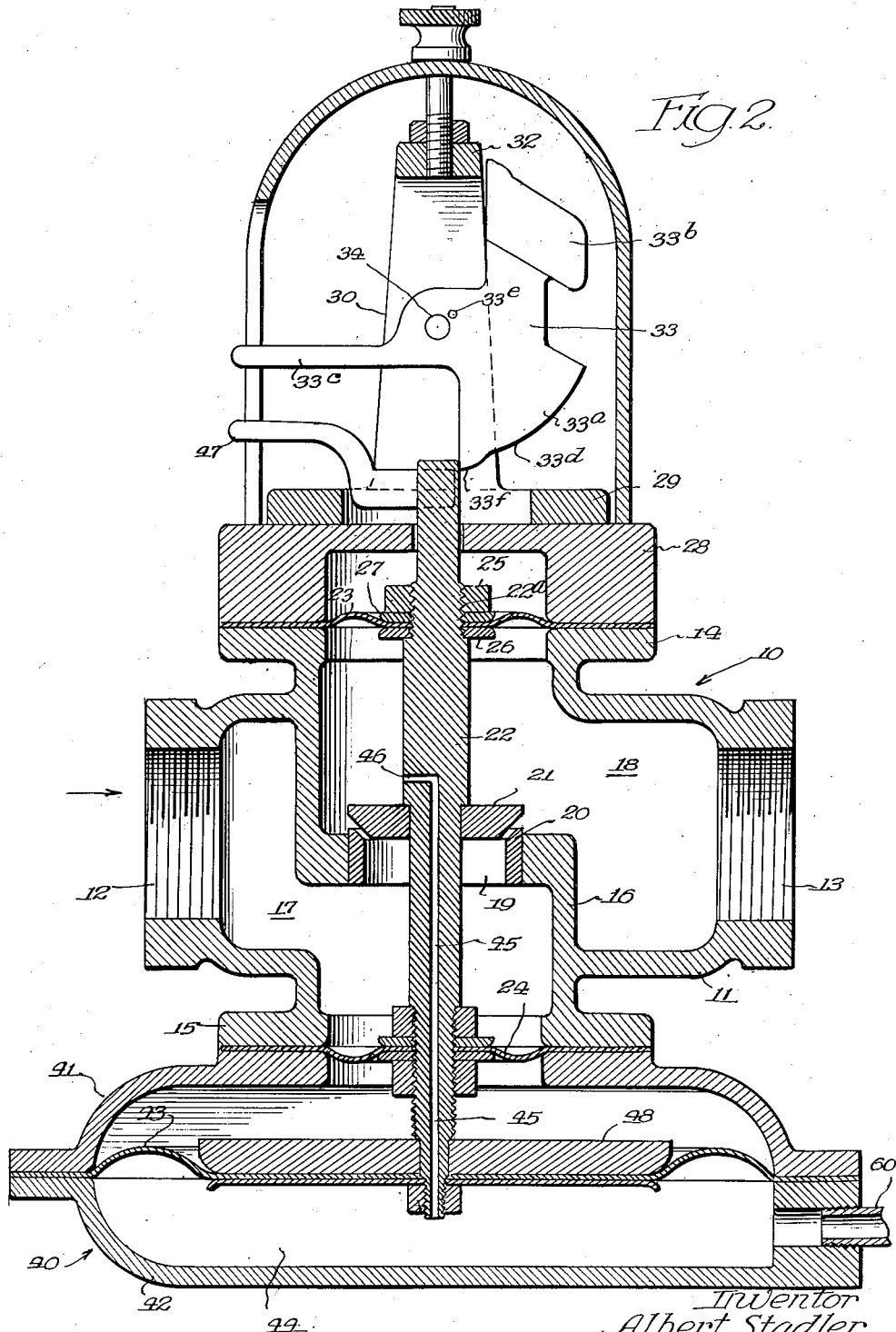

In the drawings which accompany this specification:

Fig. 1 is an elevational view, partly in section, of a self-contained unit comprising a valve together with a control mechanism in accordance with the invention; and Fig. 2 is a sectional view on line 2—2 of Fig. 1.

The valve, per se, is identified as a whole by reference numeral 10 and includes a cast body 11 having an inlet port 12, an outlet port 13, an upper flange 14 and a lower flange 15. Within the body 11 is a partition 16 which divides the valve into two chambers 17 and 18 which are interconnected through a valve port 19 having an

2 annular valve seat 20 which is adapted to co-operate with a valve disc 21 to open and close port 19.

The valve disc 21 is carried by a valve stem 22 which, in turn, is supported by two resilient diaphragms 23 and 24, which serve to permit a limited vertical movement of the valve stem 22 and valve disc 21 while at the same time functioning as closure means to prevent unintended escape of gas from the valve. The stem 22 is threaded at 22a to engage a nut 25 and is provided with an upwardly facing shoulder forming a seat for a washer 26 which co-operates with the nut 25 to hold the inner portion of the diaphragm 23 in clamped relation with the valve stem 22. The connection of the valve stem 22 to diaphragm 24 is effected in the same way as the connection to diaphragm 23 and is shown in Fig. 2.

The outer margin of the diaphragm 23 is gripped between the flange 14 and an inverted cup-shaped casting 28 upon which is mounted a yoke casting 29 having two spaced uprights 30 and 31 which are connected at their upper ends by a bridge 32.

A rotary latch 33, preferably a casting, is pivotally supported at 34 (Fig. 2) by means of trunnions 35 and 36 which, in turn, are supported by uprights 30 and 31, such latch consists of a cam portion 33a, a weight portion 33b, and a lever portion 33c. The weight portions function to urge or bias the latch in a clockwise direction as viewed in Fig. 2 and the lower portion constitutes means whereby the latch may be manually rotated in a counterclockwise direction as viewed in Fig. 2. The cam portion 33a has a peripheral arcuate surface 33d with its radial center at 33e, and is provided with a radial projection at 33f which normally bears against the upper end of the valve stem 22, as clearly illustrated in Fig. 2. Whenever the valve stem 22 is depressed sufficiently to allow the projection 33f to clear the top thereof the latch 33 will rotate about its pivotal center and the cam surface 33d will engage the top of the valve stem and force the same down so as tightly to clamp the valve disc 21 against its seat 20.

Secured to the lower flange 15 of the body 11 is a casing 40 consisting of an upper portion 41 and a lower portion 42. Between these portions is clamped a resilient diaphragm 43 which forms the upper wall of a pressure chamber 44. The latter is in communication with the chamber 18 via a small passageway 45 which extends axially through the lower end portion of the valve stem 22 and connects with a lateral opening 46 that leads to the chamber 18. Assuming that the chamber 44 is otherwise fully closed it will be apparent that the unit pressure therein is identical with the unit pressure in the chamber 18; and if said unit pressure is normal or higher than normal it will bear upwardly on diaphragm 43 with sufficient force to hold valve stem 22 in open-valve position, as depicted in Fig. 2. If, on the other hand, the pressure in the chamber 18, and the concomitant pressure in the chamber 44, is reduced, the upwardly acting force on diaphragm 43 will diminish correspondingly and result in a lowering of the valve stem 22. In the event of a gas pressure reduction sufficient to lower the upper end of the valve stem enough to clear the projection 33f, the latch 33 will quickly rotate in a clockwise direction as viewed in Fig. 2 and thus cause the cam surface 33a to force the valve stem downwardly and thereby tightly close the valve disc 21 against its seat 20. The valve as a whole thereafter remains closed until it is reopened manually by rotating the latch 33 in a counterclockwise direction. Restoration of the gas pressure cannot reopen the valve because the valve disc 21 is forcibly held closed by the latch; and, in addition, the downward pressure on the diaphragm 24 fully counterbalances the upward pressure on said valve disc. A handle 47 is connected to the upper end of the valve stem 22 and serves after resetting of the latch to facilitate opening the valve in the absence of sufficient pressure in the chamber 44 to accomplish that end, it being understood that there is no pressure in the chamber 18 when the valve is closed and thus no pressure in the chamber 44.

A metal disc 48 is attached to the lower end of the valve stem 22 and provides enough weight to lower the valve stem sufficiently to bring about a release of the latch 33 notwithstanding the opposing resistance, if any, of the diaphragms 23, 24 and 43. It is contemplated that the disc 48 will be of such weight that the valve will close when the gas pressure drops below some predetermined value.

Attached to the valve body 1 is a casing 50 having a removable cover plate 51. Between such cover plate and said casing is clamped a resilient diaphragm 52, the latter forming a flexible wall between an air chamber 53 at one side and a gas chamber 54 at the other side. A threaded opening 55 in the cover plate 51 provides for introduction of air under pressure into the chamber 53, the usual practice being to connect the chamber 53 with the air which is to be mixed with the fuel gas that is supplied to the furnace.

The casing 50 with which the self contained unit as a whole is used has a bore 50a for receiving a plug 56 which is slidable axially in said bore 50a and is provided with a shoulder 56a that is adapted to seat on an annular seat 50b. A helical compression spring 57 presses outwardly against the plug 56, and the latter bears against the diaphragm 52. In the absence of air pressure of predetermined magnitude in the chamber 53, the plug 56 is held away from the annular seat 50b by the spring 57. Suitable grooves are provided so that when the plug 56 is unseated any pressure in the chamber 54, above atmospheric, will escape past said plug and out of casing 50 by way of an opening 58 which may be connected with a vent pipe.

Normally the air pressure in the chamber 53 is sufficient to deflect the diaphragm 52 and force the plug 56 against the annular seat 50b so that the pressure in the chamber 54 cannot escape via the opening 58 as shown in Fig. 1, said chamber 54 is connected by means of a pipe 60 with the chamber 44.

It will be evident that the gas in the chamber 44 cannot escape via the pipe 60 as long as the plug 56 is kept seated by the air pressure in the chamber 53, and that so long as proper air and gas pressures are maintained the valve stem 22 continues to be held in its open position by the pressure in the chamber 44. Should there be a failure or abnormal reduction of air pressure in the chamber 53, the plug 56 will immediately be unseated by the spring 57, relieving the pressure in the chamber 54 and, at the same time, in the chamber 44. The valve stem 22 will thereupon drop sufficiently to permit rotation of the latch 33, and the valve disc 21 will be forced into closing engagement with valve seat 20 and held in that position until manually restored in the manner previously described.

The pressure in the chamber 44 will drop very quickly in response to a failure of air pressure because the passageways 45 and 46 are of very small cross-sectional area and will, for that reason, not conduct gas from the valve chamber 18 into the chamber 44 fast enough to prevent a rapid pressure drop in the chamber 44. Once the valve port 19 is closed very little additional gas can escape via the passageways 45 and 46 because the pressure in the chamber 18 quickly decreases to atmospheric.

In the interest of clarity and simplicity of expression I have employed the term "diaphragm" throughout the appended claims, but I wish that term to be construed as embracing not only diaphragms in the specific sense but all such mechanical equivalents as pistons, Sylphon bellows etc.

Obviously, my invention is capable of a great variety of alternative embodiments and modifications, many of which will readily suggest themselves to those skilled in the art once the underlying principle has been made known and, accordingly, it is not my intention to limit the scope thereof except as indicated by the following language of the claims.

Having described my invention, what I claim as new and wish to secure by Letters Patent is:

1. The combination in an automatic control device, of a pressure chamber having a movable diaphragm forming one wall thereof and adapted to be connected to a first source of fluid pressure, a discharge valve for said pressure chamber, said valve being biased toward open position, and fluid-pressure-operated means adapted for connection to a second source of fluid pressure and operable thereby to hold said valve closed when the applied fluid pressure from said second source less the fluid pressure from said first source exceeds a predetermined value, and to release said valve when said applied fluid pressure drops below said predetermined value.

2. The combination in an automatic control device, of a first pressure chamber having a movable diaphragm forming one wall thereof and adapted to be connected to a first source of fluid pressure, a discharge valve for said first pressure chamber, said valve being biased toward open position whereby to release the pressure from said first pressure chamber, a second pressure chamber having a movable diaphragm forming one wall thereof, said second chamber being adapted to be connected to a second source of fluid pressure, said last-mentioned diaphragm being operatively connected to said valve and effective to hold said valve closed when, and only when, the pressure within said second chamber exceeds a certain predetermined value in excess of the pressure in said first pressure chamber.

3. The combination with a main valve having a longitudinally reciprocable valve stem for opening and closing the valve, said valve being biased toward closed position, of mechanism operative under certain conditions to hold said valve open but effective automatically to release said valve and thus effect closure thereof in response to a failure of pressure of either of two independent fluid-pressure sources, said mechanism comprising: structure defining a first pressure chamber having a flexible diaphragm connected to said valve stem and forming one wall of said chamber, said first pressure chamber being normally connected to one only of said fluid-pressure sources, said main valve being adapted to be held open by said diaphragm when the pressure within said first chamber exceeds a certain predetermined value, a relief valve for said first chamber adapted when open to release the pressure in said first chamber and thereby result in closure of said main valve, and structure defining a second pressure chamber having a flexible diaphragm forming one wall thereof, said last mentioned diaphragm being connected to said relief valve and operative to hold said relief valve closed when the pressure within said second chamber exceeds a certain predetermined value in excess of the pressure in said first chamber, said relief valve being biased toward open position, said second pressure chamber being normally connected to the other only of said fluid-pressure sources.

4. In combination, a main valve having a longitudinally reciprocable valve stem for opening and closing the valve, a valve disc carried by said valve stem, a valve seat co-operating with said valve disc, said main valve being biased toward closed position, and a mechanism operative under certain conditions to hold said valve open but effective automatically to release said valve and thus effect closure thereof, said mechanism comprising: structure defining a first pressure chamber provided with means for connection to a source of gas under pressure and having a flexible diaphragm forming one wall thereof, said diaphragm being connected to one end of said valve stem, said valve stem having a small sized passageway connecting said first pressure chamber with the interior of said main valve on the discharge side of said valve disc, said valve stem being held in open-valve position by said diaphragm when the pressure within said first pressure chamber exceeds a certain predetermined value, a relief valve for said first pressure chamber, said relief valve being biased toward open position, and structure defining a second pressure chamber normally connected to a source of air under pressure, said second pressure chamber having a diaphragm forming one wall thereof, said last mentioned diaphragm being connected with said relief valve and operative by the fluid pressure within said second chamber to hold said relief valve closed so long only as the pressure within said second pressure chamber remains above a certain predetermined value in excess of the pressure within said first chamber.

ALBERT STADLER.

REFERENCES CITED

The following references are of record in the file of this patent:

UNITED STATES PATENTS

| Number | Name | Date |
|---|---|---|
| 1,303,801 | Jones | May 13, 1919 |